United States Patent
Korsbo et al.

(10) Patent No.: US 9,322,699 B2
(45) Date of Patent: Apr. 26, 2016

(54) RADAR LEVEL GAUGE AND METHODS OF TESTING RADAR LEVEL GAUGE AND SYSTEM

(71) Applicant: Rosemount Tank Radar AB, Gothenburg (SE)

(72) Inventors: Thense Korsbo, Lycke (SE); Christian Skaug, Ojersjo (SE); Tomas Wennerberg, Kallered (SE); Michael Larsson, Goteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 255 days.

(21) Appl. No.: 13/934,969

(22) Filed: Jul. 3, 2013

(65) Prior Publication Data

US 2015/0009063 A1 Jan. 8, 2015

(51) Int. Cl.
*G01F 23/284* (2006.01)
*G01F 25/00* (2006.01)

(52) U.S. Cl.
CPC .......... *G01F 25/0061* (2013.01); *G01F 23/284* (2013.01)

(58) Field of Classification Search
CPC ... G01F 23/284; G01F 23/2845; G01F 25/0061
USPC ........................................................ 342/124
See application file for complete search history.

(56) References Cited

U.S. PATENT DOCUMENTS

| | | | |
|---|---|---|---|
| 5,357,801 A | 10/1994 | Sinclair | |
| 6,295,018 B1 | 9/2001 | Diede et al. | |
| 7,088,285 B2 | 8/2006 | Smith | |
| 7,525,476 B1* | 4/2009 | Delin et al. | 342/124 |
| 7,532,155 B2 | 5/2009 | Kleman et al. | |
| 7,551,122 B1 | 6/2009 | Delin et al. | |
| 7,719,462 B2 | 5/2010 | Harwood et al. | |
| 8,009,085 B2 | 8/2011 | Kuhlow et al. | |
| 8,018,373 B2* | 9/2011 | Edvardsson | 342/124 |
| 2009/0282892 A1 | 11/2009 | Sai | |

(Continued)

FOREIGN PATENT DOCUMENTS

EP 2199763 6/2012
WO WO 2012/159683 11/2012

OTHER PUBLICATIONS

Notification of Transmittal of the International Search Report and the Written Opinion of the International Searching Authority from Application No. PCT/EP2014/063762, dated Sep. 11, 2014.

*Primary Examiner* — Timothy A Brainard

(74) *Attorney, Agent, or Firm* — Westman, Champlin & Koehler, P.A.

(57) ABSTRACT

The present invention relates to a radar level gauge comprising a reference reflector arranged at a known reference reflector level in a tank. The radar level gauge is controllable between a filling level measuring state and a proof test state. In the proof test state, the radar level gauge is configured to determine a first verification level based on a reference reflector echo resulting from reflection of an electromagnetic transmit signal at the reference reflector; determine a second verification level based on a surface echo resulting from reflection of an electromagnetic transmit signal at the surface of the product; and provide the first verification level and the second verification level to allow determination of a proof test result based on at least the first verification level, the known reference reflector level and the second verification level.

41 Claims, 5 Drawing Sheets

(56) References Cited

U.S. PATENT DOCUMENTS

| | | | |
|---|---|---|---|
| 2010/0156702 A1* | 6/2010 | Edvardsson | 342/124 |
| 2012/0056774 A1* | 3/2012 | Wennerberg | G01F 23/284 342/124 |
| 2013/0118251 A1* | 5/2013 | Welle et al. | 73/290 R |

* cited by examiner

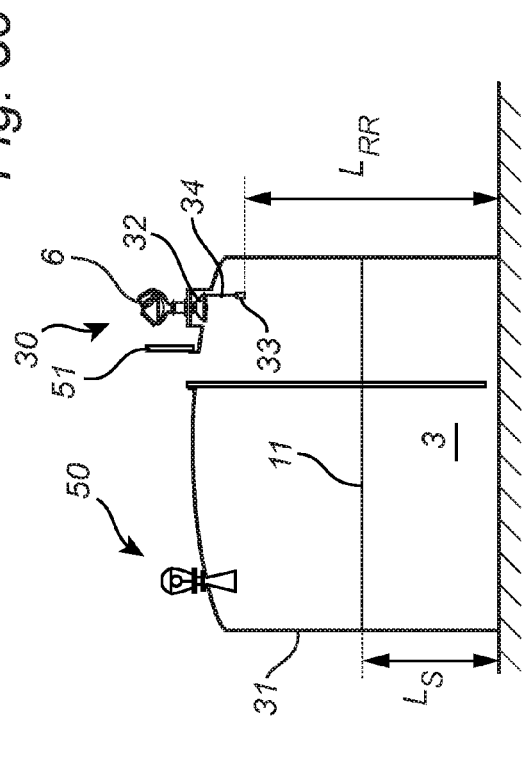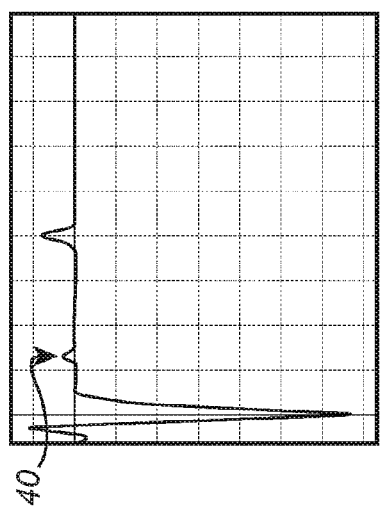

RADAR LEVEL GAUGE AND METHODS OF TESTING RADAR LEVEL GAUGE AND SYSTEM

TECHNICAL FIELD OF THE INVENTION

The present invention relates to a radar level gauge and to methods for proof test of a radar level gauge and a level measuring system comprising such a radar level gauge.

TECHNICAL BACKGROUND

Radar level gauges are in wide use for measuring the filling level of a product contained in a tank. Radar level gauging is generally performed either by means of non-contact measurement, whereby transmitted electromagnetic signals are radiated towards the product contained in the tank, or by means of contact measurement, often referred to as guided wave radar (GWR), whereby transmitted electromagnetic signals are guided towards and into the product by a probe acting as a waveguide.

The transmitted electromagnetic signals are reflected at the surface of the product, and the reflected signals are received by a receiver or transceiver comprised in the radar level gauge. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time and the propagation velocity along the probe of the electromagnetic signals.

Radar level gauges are often classified as either pulsed system or FMCW-systems. In pulsed systems, pulses are transmitted towards the surface of the product, and the distance to the surface is determined based on the time-of-flight of the pulse to the surface and back to the radar level gauge. In FMCW-systems, a signal with varying frequency is transmitted towards the surface and the distance is determined based on the frequency (and/or phase) difference between a transmitted signal and a simultaneously received signals. So-called pulsed FMCW-systems also exist.

Radar level gauges are in some cases used for applications where malfunction of the radar level gauge could result in dangerous situations.

For example, a radar level gauge with overfill prevention functionality must be extremely reliable.

Various measures are taken to ensure the reliability of radar level gauges, in particular radar level gauges with overfill prevention functionality, and to thereby reduce the risk of dangerous situations, such as overfill. For instance, radar level gauges and other important devices may be designed to fulfill a certain Safety Integrity Level (SIL) as defined by the international standard IEC/EN 61508. According to this standard, safety related systems may fulfill the requirements for different Safety Integrity Levels from $SIL_1$ to $SIL_4$, where $SIL_4$ represents the highest safety integrity level and $SIL_1$ represents the lowest safety integrity level.

The SIL-rating of a system is related to the probability of failure on demand, which is in turn a function of the failure rate and the time between proof tests. To maintain a certain SIL-rating, it is thus necessary to perform proof tests at a regular interval specified in accordance with the SIL-rating. For example, proof tests may need to be performed annually.

Proof tests are generally specified by the manufacturer of the SIL-rated system and it is the responsibility of the user of the system that the proof tests are carried out properly.

For radar level gauges with overfill prevention capability, many manufacturers specify that so-called two-point verification checks should be included in the proof test. In a two-point verification check, measurement of two different filling levels are performed and verified. Ideally, the two different filling levels should be far apart, i.e. one level close to the bottom of the tank and one level close to the top of the tank.

This procedure may take quite a lot of time and requires personnel to be involved in pumping and measuring. Furthermore, deliberately raising the level of product in the tank to a high level may actually involve an increased risk for a potentially dangerous overfill condition.

GENERAL DISCLOSURE OF THE INVENTION

In view of the above-mentioned and other drawbacks of the prior art, a general object of the present invention is to provide an improved radar level gauge and method for proof test of a filling level measuring system including a radar level gauge.

According to a first aspect of the present invention, it is therefore provided a method for proof test of a filling level measuring system for determining a filling level of a product in a tank, the filling level measuring system comprising a radar level gauge having a reference reflector arranged at a known reference reflector level above a surface of the product; and a host system receiving measurement signals from the radar level gauge, wherein the method comprises the steps of: transmitting, by the radar level gauge, a plurality of electromagnetic transmit signals towards a surface of the product in the tank; receiving, by the radar level gauge, a plurality of electromagnetic reflection signals, each including a plurality of echoes resulting from reflection of a corresponding one of the electromagnetic transmit signals at impedance discontinuities encountered by the electromagnetic transmit signal; determining a first verification level based on a reference reflector echo resulting from reflection of one of the electromagnetic transmit signals at the reference reflector; determining a second verification level based on a surface echo resulting from reflection of one of the electromagnetic transmit signals at the surface of the product; and determining a proof test result based on at least the first verification level, the known reference reflector level and the second verification level.

The tank may be any container or vessel capable of containing a product, and may be metallic, or partly or completely non-metallic, open, semi-open, or closed.

The first verification level may advantageously be determined based on several reference reflector echoes resulting from reflection of several electromagnetic transmit signals at the reference reflector. This may increase the accuracy in the determination of the first verification level. Analogously, the second verification level may advantageously be determined based on several surface echoes resulting from reflection of several electromagnetic transmit signals at the surface of the product.

The known reference reflector level may advantageously be determined through one or several level measurements carried out in connection with installation of the radar level gauge. Alternatively, the known reference reflector level may be determined by physically measuring the position of the reference reflector in connection with installation of the radar level gauge (or in connection with installation of the reference reflector if this is at a later time).

The known reference reflector level may, for example, be stored in the radar level gauge and/or be kept in reference documentation.

Furthermore, the first verification level and the second verification level may be determined based on the same measurement. Alternatively, the first verification level and the second verification level may be determined based on different measurements.

The present invention is based on the realization that a proof test including a two-point verification check can be carried out without having to change the filling level by using a reference reflector arranged at a known position above the surface of the product for one of the verification measurements.

Hereby, the ability of the radar level gauge to measure accurately can be verified, and the capability of the radar level gauge to identify and measure the surface of the product can be ascertained. Moreover, since the filling level does not have to be changed for the two-point verification check to be carried out, this can be achieved in a relatively short period of time and with a minimum of operator involvement.

The step of determining the second verification level may advantageously comprise the steps of identifying the reference reflector echo; determining a set of surface echo candidates excluding the reference reflector echo; and assigning one surface echo candidate in the set of surface echo candidates as the surface echo.

In various embodiments, the method according to the present invention may further comprise the step of determining the filling level without using the radar level gauge. In such embodiments, the proof test result may additionally be based on the filling level.

The filling level may be determined using another method for filling level determination, using another radar level gauge, or using another measurement channel sharing propagating device (radiating antenna or probe) with the radar level gauge to be subjected to the two-point verification check. The latter configuration may be referred to as a 2-in-1 configuration.

Another method for filling level determination may, for instance, be manual measurement through so-called hand dipping, or the filling level may be determined based on input from other sensors, such as flow sensor, pressure sensors, ultrasonic level sensors etc.

The proof test result may advantageously be determined based on a first difference between the first verification level and the known reference reflector level and a second difference between the second verification level and the filling level.

The criteria for a successful proof test result may depend on various factors, such as the accuracy of the reference values, i.e. the known reference reflector level and the filling level.

According to one embodiment, the proof test result may be determined to be positive if a ratio between the first difference and the first verification level is below a first threshold value; and a ratio between the second difference and the second verification level is below a second threshold value, wherein the first threshold value is substantially smaller than the second threshold value.

Since the known reference reflector level can be determined with high precision, it can be required that the first verification level is close to the known reference reflector level. Depending on the method or equipment used for determining the filling level used as a reference with which the second verification level is compared, the precision of this measurement may be considerably lower.

By adapting the requirements for the different verification levels in this manner, a high quality two-point verification check is provided for, in which tough requirements are set without arriving at a negative proof test result due to inaccuracy of the reference measurement.

In this context, a "positive" proof test result should be understood to mean that the device has passed the proof test.

For instance, the first threshold value may be smaller than one half of the second threshold value.

According to various embodiments, the reference reflector may be arranged at or above a high level alarm limit for the tank, and the method may further comprise the steps of: determining a proof test filling level based on a reference reflector echo resulting from reflection of one of the electromagnetic transmit signals at the reference reflector; and providing, to the host system, a signal indicative of the proof test filling level.

In addition to testing the performance of the radar level gauge, it is important to regularly test other parts of the filling level measuring system, such as, for example, security related parts of the host system or emergency shutdown systems.

It is of particular importance to test the high level alarm (and/or high high level alarm) that should ensure that an alert or an alarm is provided if the level of the product in the tank rises above the high level alarm limit for the tank.

One way of testing all parts of an overfill detection (or high level alarm) system—from the sensor at the tank to alert/alarm device in a remote location such as the control room—is to deliberately raise the level of product in the tank to a level above the high level alarm limit. This is obviously not desirable, since it disrupts operation of the tank, takes time, and involves risk for overfill due to human error and risk for exposure of humans and the environment to product vapor.

Through the present embodiment of the invention, a reliable check of all parts of the overfill detection system can be achieved without raising the level of product in the tank. Instead, the radar level gauge is controlled from a level measuring state to a high level alarm test state. In the high level alarm test state, the radar level gauge identifies the reference reflector echo, assigns the reference reflector echo as the surface echo and provides to the host system a signal indicative of a filling level corresponding to the level of the reference reflector. The reaction of the host system to the signal indicating the filling level at or above the high level alarm limit can then be monitored. The result will be the same as if the filling level had actually been raised.

After the test has been carried out, the radar level gauge can be controlled back to the level measuring state, in which the reference reflector echo is excluded from the set of surface echo candidates considered for determining the filling level.

It should be noted that this part of the proof test procedure (the high level alarm test) may be carried out at a different point in time than the two point verification check procedure described further above.

According to a second aspect of the present invention, it is provided a radar level gauge for determining a filling level of a product in a tank, the radar level gauge comprising: a transceiver for generating, transmitting and receiving electromagnetic signals; a reference reflector arranged at a known reference reflector level above a surface of the product; a propagating device connected to the transceiver and arranged to propagate a plurality of electromagnetic transmit signals from the transceiver towards the product in the tank, and to return to the transceiver a plurality of electromagnetic reflection signals, each including a plurality of echoes resulting from reflection of a corresponding one of the electromagnetic transmit signals at impedance discontinuities encountered by the electromagnetic transmit signal; and processing circuitry for determining the filling level based on a surface echo resulting from reflection of one of the electromagnetic transmit signals at the surface of the product, wherein the radar level gauge is controllable between a filling level measuring state and a proof test state, and wherein, in the proof test state, the processing circuitry is configured to: determine a first verification level based on a reference reflector echo resulting from reflection of one of the electromagnetic transmit signals at the reference reflector; determine a second verification level based on a surface echo resulting from reflection of one of the electromagnetic transmit signals at the surface of the product; and provide the first verification level and the second verification level to allow determination of a proof test result based on at least the first verification level, the known reference reflector level and the second verification level.

The "transceiver" may be one functional unit capable of transmitting and receiving electromagnetic signals, or may be a system comprising separate transmitter and receiver units.

The processing circuitry may be provided as separate devices, or as a single device, and may be realized through hardware, software or a combination thereof.

To provide for a reliable proof test with a minimum of manual intervention, the reference reflector may advantageously be arranged and configured substantially identically in the filling level measuring state and in the proof test state.

In various embodiments of the radar level gauge according to the present invention, the reference reflector may advantageously be attached to the propagation device. Through this configuration, a suitable reference reflector echo can be provided without the need for additional through-holes through the tank roof etc.

In embodiments where the propagating device is a radiating antenna such as a horn antenna or a parabolic antenna, the reference reflector may advantageously be provided as a weight hanging from a wire that is attached to the rim of the horn or parabolic reflector, respectively.

In embodiments using a so-called still pipe, the reference reflector may, for example, be provided as a pin or other conductive structure arranged inside the still pipe.

In GWR systems using a transmission line probe as the propagation device, the reference reflector may be provided as a conductive structure that is clamped around the transmission line probe. This is particularly convenient for GWR systems using a single lead probe (sometimes referred to as a Goubau line).

In GWR systems comprising a propagation device in the form of a transmission line probe, the reference reflector may advantageously comprise a first and a second part arranged to together substantially surround the transmission line probe; and at least one releasable fastener arranged to join the first part to the second part in such a way that the transmission line probe is clamped between the first part and the second part.

The reference reflector may advantageously comprise a first releasable fastener on a first side of the transmission line probe and a second releasable fastener on a second side of the transmission line probe opposite the first side, the second releasable fastener being offset relative to the first releasable fastener in a direction parallel to a longitudinal extension of the transmission line probe. The first and second releasable fasteners may advantageously be screws, which may each have a partially unthreaded shank below its head.

Moreover, the radar level gauge according to various embodiments of the present invention may advantageously be comprised in a filling level measuring system, further comprising a host system receiving measurement signals from the radar level gauge.

For an analog output interface in the radar level gauge system, the filling level can be communicated as a current between 4 mA and 20 mA. The high level alarm limit may correspond to a current within this range. Alternatively, the high level alarm limit may be set at the radar level gauge, which may then be configured to communicate an overfill condition with an alarm current, for instance 21.75 mA (a current outside the 4 to 20 mA range).

In many field applications, there is provided a digital communication link. This will provide possibilities of communicating several indications for a present operational condition. For instance, an alarm and a determined filling level could be communicated independently of each other.

According to various embodiments, the filling level measurement may further comprise an additional filling level measuring device arranged to measure the filling level of the product in the tank.

Embodiments of, and effects obtained through this second aspect of the present invention are largely analogous to those described above for the first aspect of the invention.

In summary, it is thus provided a radar level gauge comprising a reference reflector arranged at a known reference reflector level in a tank. The radar level gauge is controllable between a filling level measuring state and a proof test state. In the proof test state, the radar level gauge is configured to determine a first verification level based on a reference reflector echo resulting from reflection of an electromagnetic transmit signal at the reference reflector; determine a second verification level based on a surface echo resulting from reflection of an electromagnetic transmit signal at the surface of the product; and provide the first verification level and the second verification level to allow determination of a proof test result based on at least the first verification level, the known reference reflector level and the second verification level.

In the inventive method, the following features may be included alone or in combination to achieve further advantages: Said step of determining said second verification level further comprises the steps of permanently arranging said reference reflector in a reference reflector position; Said test result is determined to be positive only if a difference between said first verification level and said known reference reflector level is less than a first threshold value; Said test result is determined to be positive only if said second verification level meets a predetermined level criterion based on prior surface echo measurements; Said test result is determined externally of said radar level gauge.

In the inventive method, the following features may be included alone or in combination to achieve further advantages: a further method step of determining a filling level of said product in the tank by means selected from a set including: a second radar level gauge functionally independent of said radar level gauge, an ultrasonic level gauge, a float level gauge, a level measurement based on flow of said product, a level measurement based on pressure of said product, a level measurement based on capacitance of said product, a manual level measuring procedure such as hand-dipping, wherein said test result is additionally based on a relation between second verification level and said filling level.

In the inventive method, the following features may be included alone or in combination to achieve further advantages: Said test result is determined to be positive only if said first difference is less than a first threshold value, and said second difference is less than a second threshold value; Said test result is determined to be positive only if a ratio between said first difference and said first verification level is less than a third threshold value, and a ratio between said second difference and said second verification level is less than a fourth threshold value; Said test result is determined to be positive only if said amplitude of the reference reflector echo is in a predetermined first amplitude range; Said test result is determined to be positive only if said amplitude of the surface echo is greater than said amplitude of the reference reflector echo.

In the inventive method, the following features may be included alone or in combination to achieve further advantages: Said radar level gauge is further controllable to operate in a filling level measuring state or a system proof test state, said method further comprising the steps of determining in said radar level gauge a filling level of said product based on said surface echo, providing from said radar level gauge a signal indicative of said filling level to said host system, receiving, as an input to said radar level gauge, a system proof test start command, controlling, in response to said system proof test start command, said radar level gauge to enter said proof test state, and controlling, after having provided to said host system said signal indicative of the proof test filling level, said radar level gauge to exit said system proof test state.

In the inventive method, the following features may be included alone or in combination to achieve further advantages: a further method step of issuing said system proof test start command via said host system or via an operator input device located on said radar level gauge.

In the inventive radar level gauge, the following features may be included alone or in combination to achieve further advantages: Said radiating antenna is selected from a set including a parabolic antenna, a horn antenna, and a still pipe feeder antenna, wherein said radiating antenna has a reference reflector attachment for mounting a reference reflector assembly, said reference reflector assembly including an elongated and laterally flexible suspension member coupled at an upper end to said reference reflector attachment and coupled at a lower end to a reflector surface having drip-off properties and to a weight for orientation of said reflector surface, wherein a distance between said radiating antenna and said reference reflector surface is adjustable.

BRIEF DESCRIPTION OF THE DRAWINGS

These and other aspects of the present invention will now be described in more detail, with reference to the appended drawings showing a currently preferred embodiment of the invention, wherein:

FIGS. 5a-e are schematic illustrations of the corresponding steps in the flow chart in FIG. 4.

DETAILED DESCRIPTION OF EXAMPLE EMBODIMENTS OF THE INVENTION

Figure 1:
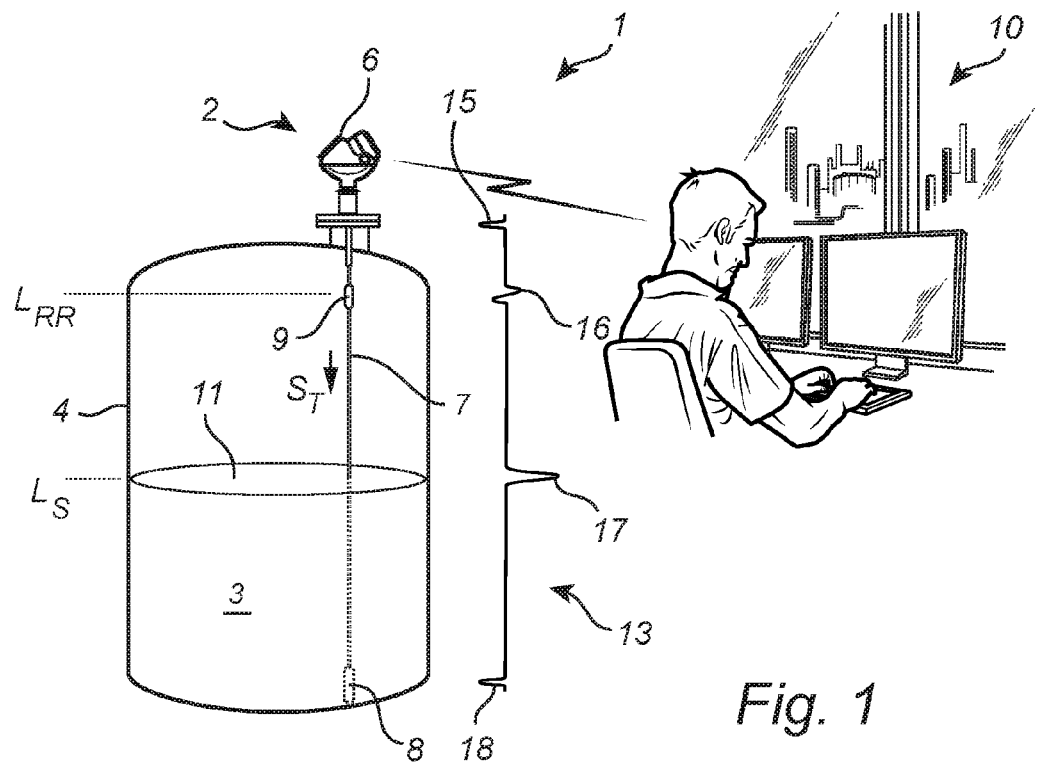
FIG. 1 schematically shows a filling level measuring system according to a first embodiment of the present invention, comprising a radar level gauge and a host system.

FIG. 1 schematically shows a level measuring system 1 according to a first embodiment of the present invention. The level measuring device 1 in FIG. 1 comprises a radar level gauge 2 of GWR (Guided Wave Radar) type and a host system 10 illustrated as a control room.

The radar level gauge 2 is installed to measure the filling level of a product 3 contained in a tank 4. The radar level gauge 2 comprises a measuring unit 6 and a propagation device in the form of a transmission line probe 7 extending from the measuring unit 6 towards and into the product 3. In the example embodiment in FIG. 1, the transmission line probe 7 is a single lead wire probe, that has a weight 8 attached at the end thereof to keep the wire probe straight and vertical. The radar level gauge 2 further comprises a reference reflector 9 attached to the transmission line probe 7 at a reference reflector level $L_{RR}$.

The measurement unit 6 comprises (not shown in FIG. 1) a transceiver, processing circuitry and a communication interface.

The transceiver is configured to generate, transmit and receive electromagnetic signals, the processing circuitry is connected to the transceiver and configured to determine the filling level $L_S$ of the product 3 based on a time-of-flight of a received electromagnetic signal being a reflection of the transmitted signal at the surface 11 of the product 3, and the communication interface is connected to the processing circuitry and configured to allow communicating with the host system 10. In the example embodiment of FIG. 1, the communication between the radar level gauge 2 and the host system 10 is indicated as being wireless communication. Alternatively, communication may, for example, take place over an analog and/or digital wire based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

When the radar level gauge 2 is in operation, it transmits an electromagnetic transmit signal $S_T$ towards the surface 11 of the product 3. The electromagnetic transmit signal $S_T$ is guided by the transmission line probe 7, and when the transmit signal $S_T$ encounters an impedance transition, a portion of the power of the transmit signal is reflected back towards the measurement unit 6 of the radar level gauge 2 as an echo having a time-of-flight corresponding to the distance from the measuring unit 6 to the impedance transition (and back).

The echoes from the different impedance transitions encountered by the transmit signal $S_T$ may be used (together with the transmit signal $S_T$) to form an echo curve 13. The echo curve 13 in FIG. 1 includes, from top to bottom, a fiducial echo 15 corresponding to the impedance transition at the connection between the transceiver and the transmission line probe, a reference reflector echo 16 resulting from reflection at the reference reflector 9, a surface echo 17 resulting from reflection at the surface 11 of the product 3, and an end-of-probe echo 18 resulting from reflection at the end of the transmission line probe 7.

By identifying and analyzing the different echoes in the echo curve 13, for example, the reference reflector level $L_{RR}$ and the filling level $L_S$ can be determined.

As will be described in more detail further below, the radar level gauge 6 in FIG. 1 is configured to allow the operator of the filling level measuring system 1 to carry out reliable proof tests of the radar level gauge 6 itself as well as of the filling level measuring system 1 as a whole.

An example configuration of the reference reflector 9 in FIG. 1 will now be described in detail with reference to FIG. 2.

Figure 2:
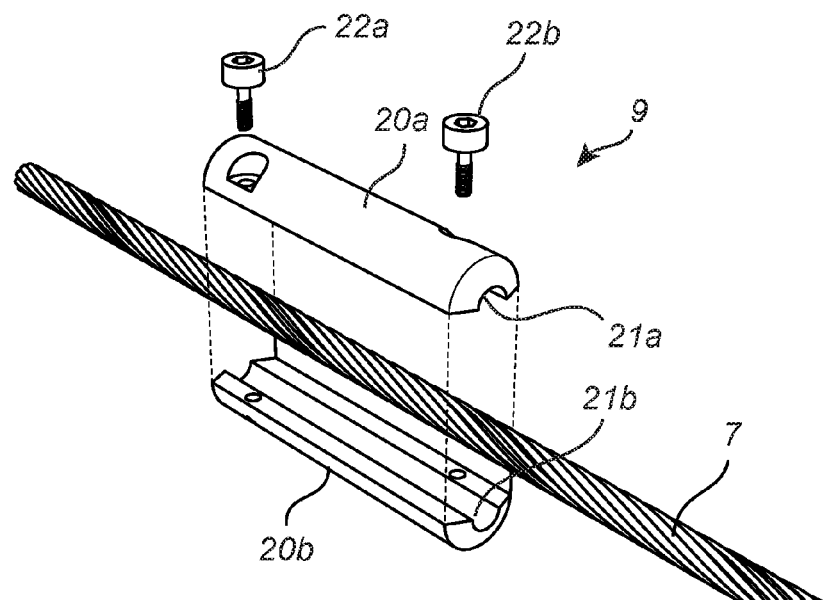
FIG. 2 is an exploded perspective view of the reference reflector comprised in the radar level gauge in FIG. 1.

As can be seen in FIG. 2, the reference reflector 9 comprises a first part 20a and a second part 20b. As is schematically shown in FIG. 2, each of the first part 20a and the second part 20b has a substantially semi-cylindrical groove 21a-b for accommodating the wire probe 7. The grooves 21a-b are dimensioned with such a depth that the wire probe 7 is clamped between the first 20a and second 20b parts when the first 20a and second 20b parts are pulled together through the action of the releasable fasteners, here screws 22a-b. As is shown in FIG. 2, the reference reflector 9 is configured such that the screws 22a-b are arranged on opposite sides of the wire probe 7 and offset relative to each other along the longitudinal extension of the wire probe 7. Moreover, the screws have partly unthreaded shanks to allow to first 20a and the second 20b to be pulled together sufficiently tightly by the screws.

A second embodiment of the filling level measuring system 1 according to the present invention will now be described with reference to FIG. 3. The embodiment of the filling level measuring system 1 shown in FIG. 3 differs from that described above with reference to FIG. 1 in that the radar level gauge 30 in FIG. 3 is a free radiating radar level gauge 30 arranged to measure the filling level of product 3 in a storage tank 31 (rather than a "process tank" as schematically shown in FIG. 1).

The radar level gauge 30 comprises a measurement unit 6, a propagation device in the form of a parabolic antenna 32, and a reference reflector 33 including a reflecting surface. The reference reflector 33 further includes a metal weight suspended in a flexible wire 34 that is attached to the rim of the parabolic antenna 32. A function of the weight is to achieve a suitable orientation of the reflecting surface, preferably generally perpendicular to a central longitudinal axis of the antenna 32. A similar reflector arrangement, structure, and function is applicable in combination with a horn antenna, a feeder for a still pipe, and other antennas.

Figure 3:
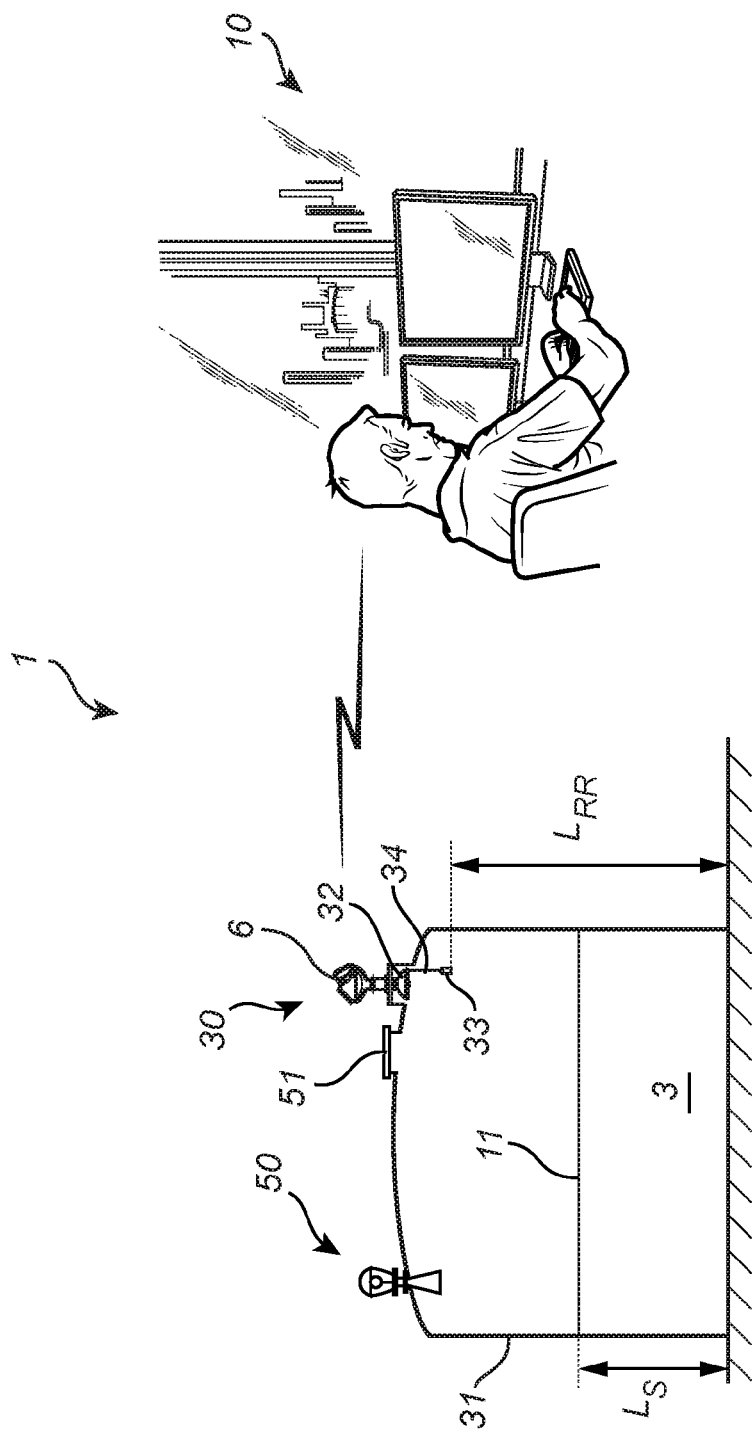
FIG. 3 schematically shows a filling level measuring system according to a second embodiment of the present invention, comprising a radar level gauge and a host system.

As can be seen in FIG. 3, the tank 31 is equipped with an additional radar level gauge 50 which may be used for determining the filling level $L_S$. It would also be possible to use a so-called 2-in-1 solution if the radar level gauge 30 includes two separated measurement channels, effectively making it two radar level gauges sharing the same antenna.

In addition, the tank 31 comprises an inspection hatch 51 allowing access to the inside of the tank 31 for enabling, for example, hand dipping for manually determining the filling level $L_S$.

Figure 4:
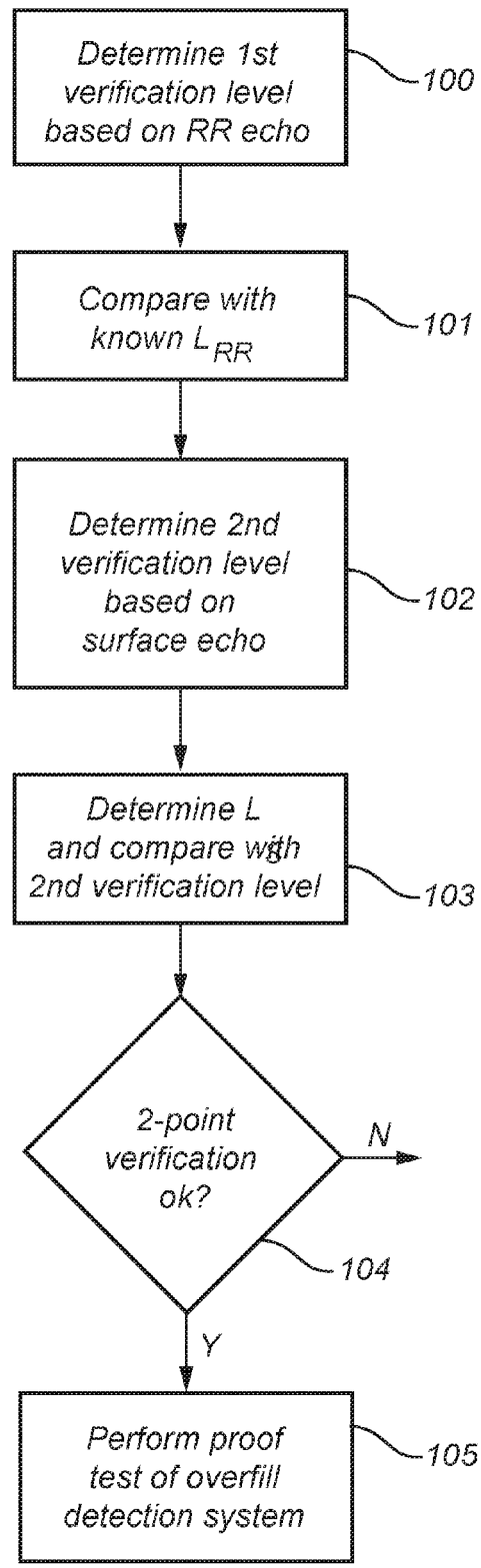
FIG. 4 is a flow chart illustrating an example embodiment of the method according to the present invention.

An example embodiment of the method according to the present invention will now be described with reference to the flow chart in FIG. 4 and the illustrations in FIGS. 5a-e.

In a first step 100, a first verification level is determined by the radar level gauge 30 based on the reference reflector echo 40 resulting from reflection of the electromagnetic transmit signal $S_T$ at the reference reflector 33.

In the next step 101, the first verification level determined in step 101 is compared with the known reference reflector level $L_{RR}$ that was previously determined using the radar level gauge 30. The known reference reflector level $L_{RR}$ may advantageously be determined upon installation of the radar level gauge 30, or upon installation of the reference reflector 33 in case the reference reflector 33 is added to an existing radar level gauge 30.

The known reference reflector level LRR determined by the radar level gauge 30 can be verified by manual measurement, for example using a measuring tape or similar.

In the subsequent step 102, a second verification level is determined by the radar level gauge 30 based on the surface echo 41 resulting from reflection of the electromagnetic transmit signal $S_T$ at the surface 11 of the product.

Thereafter, in step 103, the filling level $L_S$ is determined without using the radar level gauge 30 that is undergoing proof testing. Depending on the configuration of the tank 31, there are different ways of doing this.

The exemplary tank 31 in FIG. 5d is equipped with an additional radar level gauge 50 which may be used for determining the filling level $L_S$. It would also be possible to use a so-called 2-in-1 solution if the radar level gauge 30 includes two separated measurement channels, effectively making it two radar level gauges sharing the same antenna.

It is also possible to determine the filling level $L_S$ manually, for example by hand dipping through the inspection hatch 51 or other access to the inside of the tank 31.

The filling level $L_S$ determined without using the radar level gauge 30 under test is compared with the second verification level.

In step 104, it is determined if the result of the two-point verification check carried out in steps 100 to 103 was positive. This determination may be carried out by evaluating the difference between the verification levels determined in steps 100 and 102 with the corresponding reference levels (the known reference reflector level $L_{RR}$ and the filling level $L_S$, respectively) in respect of threshold values taking into account the accuracy in the determination of the respective reference levels. For instance, the requirement on the first verification level (based on the reference reflector echo 40) may be more severe than the requirement on the second verification level, in particular if hand dipping was used to determine the filling level $L_S$.

If the two-point verification test is determined to be negative, this should be noted and further investigation into the cause of the negative result should be carried out. Possible causes can, for example, include mistakes made during the test procedure, incorrect settings in the system, and equipment malfunction.

If the two-point verification test is determined to be positive, the method may proceed to step 105 in which a further proof test of the overfill detection system is carried out.

In normal operation, the radar level gauge 30 will keep track of the reference reflector echo 40 and exclude this echo from the set of surface echo candidates from which the surface echo 41 is selected based on a set of selection criteria. In the procedure carried out in step 105, however, the radar level gauge 30 is controlled, following receipt of a command to execute overfill detection proof test, to instead output the reference reflector level $L_{RR}$ as the proof test filling level.

In a filling level measuring system using a 4-20 mA loop for providing measurement values from the radar level gauge 30 to the host system 10, the filling level can be communicated as a current between 4 mA and 20 mA. Since the reference reflector level $L_{RR}$ is, in the embodiment of FIGS. 5a-e, at or above the high level alarm limit, the reference reflector level $L_{RR}$ is outside the filling level range. Depending on the settings of the radar level gauge 30, the proof test filling level can thus be represented by an alarm current outside the normal operating current range, such as 21.75 mA.

Many filling level measuring systems have digital communication capabilities instead of, or as a complement to, the above-described analog communication. In such filling level measuring systems, the proof test filling level may be reported as a digital signal representing a filling level and/or using an alarm indication.

Figure 5E:
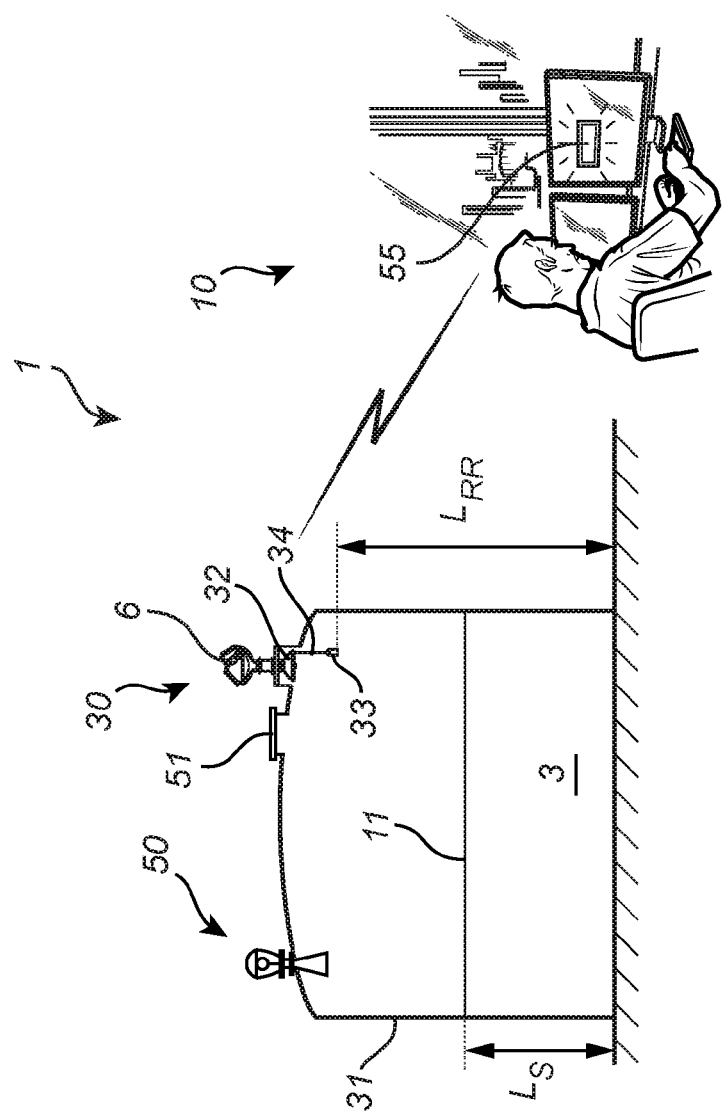

Regardless of which signal is provided by the radar level gauge 30, this signal is received by the host system 10 and processed at that end. Since, in the present case, the proof test filling level reported by the radar level gauge 30 is at or above the high level alarm limit set for the filling level measuring system, the host system 10 will provide an alert or alarm to the operator, as is schematically indicated in FIG. 5e as an alert image 55 on the screen.

It should be noted that step 105 may take place directly following the preceding steps or at a later point in time.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A method for testing a radar level gauge arranged at a tank containing a product, said radar level gauge comprising a reference reflector, the reference reflector being arranged at a known reference reflector level, wherein the method comprises the steps of:
   transmitting a plurality of electromagnetic transmit signals towards a surface of said product in the tank;
   receiving a plurality of electromagnetic reflection signals, each including several echoes resulting from reflection of a corresponding one of said electromagnetic transmit signals at impedance discontinuities encountered by the electromagnetic transmit signal;
   determining a first verification level based on a reference reflector echo resulting from reflection of one of said electromagnetic transmit signals at said reference reflector;
   determining a second verification level based on a surface echo resulting from reflection of one of said electromagnetic transmit signals at said surface of the product; and
   determining a test result based on a relation between said first verification level and said known reference reflector level, and on said second verification level;
   wherein said test result is determined to be positive only if:
      a difference between said first verification level and said known reference reflector level is less than a first threshold value.

2. The method according to claim 1, wherein said step of determining said first verification level further comprises the steps of:
   identifying said reference reflector echo; and
   temporarily assigning said reference reflector echo as said surface echo.

3. The method according to claim 1, wherein said step of determining said second verification level further comprises the steps of:
   identifying said reference reflector echo;
   determining a set of surface echo candidates excluding said reference reflector echo; and
   assigning one surface echo candidate in said set of surface echo candidates as said surface echo.

4. The method according to claim 3, wherein said step of determining said second verification level further comprises the steps of:
   permanently arranging said reference reflector in a reference reflector position.

5. The method according to claim 1, wherein said test result is determined to be positive only if:
   said second verification level meets a predetermined level criterion based on prior surface echo measurements.

6. The method according to claim 1, wherein said test result is determined externally of said radar level gauge.

7. The method according to claim 1, further comprising the step of:
   determining a filling level of said product in the tank without using said radar level gauge,
   wherein said test result is additionally based on a relation between second verification level and said filling level.

8. The method according to claim 1, further comprising the step of:
   determining a filling level of said product in the tank by means selected from a set including:
      a second radar level gauge functionally independent of said radar level gauge, an ultrasonic level gauge, a float level gauge, a level measurement based on flow of said product, a level measurement based on pressure of said product, a level measurement based on capacitance of said product, a manual level measuring procedure such as hand-dipping;
      wherein said test result is additionally based on a relation between second verification level and said filling level.

9. The method according to claim 8, wherein said test result is determined based on a first difference between said first verification level and said known reference reflector level and a second difference between said second verification level and said filling level.

10. The method according to claim 9, wherein said test result is determined to be positive only if:
    said first difference is less than a first threshold value; and
    said second difference is less than a second threshold value.

11. The method according to claim 10, wherein said test result is determined to be positive only if:
    a ratio between said first difference and said first verification level is less than a third threshold value; and
    a ratio between said second difference and said second verification level is less than a fourth threshold value.

12. The method according to claim 10, wherein said first threshold value is less than said second threshold value.

13. The method according to claim 12, wherein said first threshold value is less than one half of said second threshold value.

14. The method according to claim 1, further comprising the steps of:
    when said tank is filled with said product to a first level above said reference reflector level:
       determining, using said radar level gauge, a first filling level;
       determining, without using said radar level gauge, a first reference filling level;
    when said tank is filled with said product to a second level below said reference reflector level:
       determining, using said radar level gauge, a second filling level;
       determining, without using said radar level gauge, a second reference filling level; and
    determining a test result based on a relation between said first filling level and said first reference filling level, and on a relation between said second filling level and said second reference filling level.

15. The method according to claim 1, further comprising the steps of:
    determining an amplitude of said reference reflector echo; and
    determining an amplitude of said surface echo.

16. The method according to claim 15, wherein said test result is determined to be positive only if:
    said amplitude of the reference reflector echo is in a predetermined first amplitude range.

17. The method according to claim 15, wherein said test result is determined to be positive only if:
    said amplitude of the surface echo is greater than said amplitude of the reference reflector echo.

18. The method according the claim 1, wherein said first verification level and said second verification level are determined based on reflections of the same electromagnetic transmit signal.

19. The method according the claim 1, wherein said first verification level and said second verification level are determined based on reflections of different electromagnetic transmit signals.

20. The method according to claim 1, wherein said known reference reflector level is stored in memory comprised in said radar level gauge.

21. The method according to claim 1, wherein said reference reflector is arranged at or above a high level alarm limit for said tank, and wherein said method further comprises the steps of:
    determining a proof test filling level based on a reference reflector echo resulting from reflection of one of said electromagnetic transmit signals at the reference reflector; and
    providing, to a host system externally of said radar level gauge, a signal indicative of the proof test filling level.

22. The method according to claim 21, wherein said radar level gauge is further controllable to operate in a filling level measuring state or a system proof test state, said method further comprising the steps of:
    determining in said radar level gauge a filling level of said product based on said surface echo;
    providing from said radar level gauge a signal indicative of said filling level to said host system;
    receiving, as an input to said radar level gauge, a system proof test start command;
    controlling, in response to said system proof test start command, said radar level gauge to enter said proof test state; and
    controlling, after having provided to said host system said signal indicative of the proof test filling level, said radar level gauge to exit said system proof test state.

23. The method according to claim 22, further comprising the step of:
    issuing said system proof test start command via said host system or via an operator input device located on said radar level gauge.

24. The method according to claim 22, wherein said step of determining said filling level in said level measuring state comprises the steps of:
    excluding said reference reflector echo from said several echoes; and
    identifying said surface echo among remaining ones of said several echoes.

25. The method according to claim 22, further comprising the step of:
    controlling said radar level gauge to exit said system proof test state a predetermined time after entering said system proof test state.

26. The method according to claim 22, further comprising the steps of:
    determining the filling level while said radar level gauge is in said proof test state; and
    controlling, if a difference between said filling level and said high level alarm limit is smaller than a threshold value, said radar level gauge back to said filling level measuring state.

27. The method according to claim 22, wherein said radar level gauge is controlled back to said filling level measuring state after a predetermined period of time.

28. The method according to claim 21, wherein said step of determining said proof test filling level further comprises the steps of:
    identifying said reference reflector echo; and
    temporarily assigning said reference reflector echo as said surface echo.

29. A method for testing a radar level gauge arranged at a tank containing a product, said radar level gauge comprising a reference reflector, the reference reflector being arranged at a known reference reflector level, wherein the method comprises the steps of:
    transmitting a plurality of electromagnetic transmit signals towards a surface of said product in the tank;
    receiving a plurality of electromagnetic reflection signals, each including several echoes resulting from reflection of a corresponding one of said electromagnetic transmit signals at impedance discontinuities encountered by the electromagnetic transmit signal;
    determining a first verification level based on a reference reflector echo resulting from reflection of one of said electromagnetic transmit signals at said reference reflector;
    determining a second verification level based on a surface echo resulting from reflection of one of said electromagnetic transmit signals at said surface of the product; and
    determining a test result based on a relation between said first verification level and said known reference reflector level, and on said second verification level,
    wherein the method further comprises the step of:
        determining a filling level of said product in the tank by means selected from a set including: a second radar level gauge functionally independent of said radar level gauge, an ultrasonic level gauge, a float level gauge, a level measurement based on flow of said product, a level measurement based on pressure of said product, a level measurement based on capacitance of said product, a manual level measuring procedure such as hand-dipping,
        wherein said test result is additionally based on a relation between second verification level and said filling level,
        wherein said test result is determined based on a first difference between said first verification level and said known reference reflector level and a second difference between said second verification level and said filling level.

30. A method for testing a radar level gauge arranged at a tank containing a product, said radar level gauge comprising a reference reflector, the reference reflector being arranged at a known reference reflector level, wherein the method comprises the steps of:
    transmitting a plurality of electromagnetic transmit signals towards a surface of said product in the tank;
    receiving a plurality of electromagnetic reflection signals, each including several echoes resulting from reflection of a corresponding one of said electromagnetic transmit signals at impedance discontinuities encountered by the electromagnetic transmit signal;
    determining a first verification level based on a reference reflector echo resulting from reflection of one of said electromagnetic transmit signals at said reference reflector;
    determining a second verification level based on a surface echo resulting from reflection of one of said electromagnetic transmit signals at said surface of the product; and determining a test result based on a relation between said first verification level and said known reference reflector level, and on said second verification level, wherein the method further comprises the steps of:
determining an amplitude of said reference reflector echo; and
determining an amplitude of said surface echo,
wherein said test result is determined to be positive only if:
said amplitude of the reference reflector echo is in a predetermined first amplitude range.

31. A method for testing a radar level gauge arranged at a tank containing a product, said radar level gauge comprising a reference reflector, the reference reflector being arranged at a known reference reflector level, wherein the method comprises the steps of:

transmitting a plurality of electromagnetic transmit signals towards a surface of said product in the tank;
receiving a plurality of electromagnetic reflection signals, each including several echoes resulting from reflection of a corresponding one of said electromagnetic transmit signals at impedance discontinuities encountered by the electromagnetic transmit signal;
determining a first verification level based on a reference reflector echo resulting from reflection of one of said electromagnetic transmit signals at said reference reflector;
determining a second verification level based on a surface echo resulting from reflection of one of said electromagnetic transmit signals at said surface of the product; and
determining a test result based on a relation between said first verification level and said known reference reflector level, and on said second verification level,
wherein the method further comprises the steps of:
determining an amplitude of said reference reflector echo; and
determining an amplitude of said surface echo,
wherein said test result is determined to be positive only if:
said amplitude of the surface echo is greater than said amplitude of the reference reflector echo.

32. A method for testing a radar level gauge arranged at a tank containing a product, said radar level gauge comprising a reference reflector, the reference reflector being arranged at a known reference reflector level at or above a high level alarm limit for said tank, wherein the method comprises the steps of:

transmitting a plurality of electromagnetic transmit signals towards a surface of said product in the tank;
receiving a plurality of electromagnetic reflection signals, each including several echoes resulting from reflection of a corresponding one of said electromagnetic transmit signals at impedance discontinuities encountered by the electromagnetic transmit signal;
determining a proof test filling level based on a reference reflector echo resulting from reflection of one of said electromagnetic transmit signals at the reference reflector; and
providing, to a host system externally of said radar level gauge, a signal indicative of the proof test filling level,
wherein said radar level gauge is further controllable to operate in a filling level measuring state or a system proof test state, said method further comprising the steps of:
determining in said radar level gauge a filling level of said product based on a surface echo resulting from reflection of one of said electromagnetic transmit signals at said surface of the product;
providing from said radar level gauge a signal indicative of said filling level to said host system;
receiving, as an input to said radar level gauge, a system proof test start command;
controlling, in response to said system proof test start command, said radar level gauge to enter said proof test state; and
controlling, after having provided to said host system said signal indicative of the proof test filling level, said radar level gauge to exit said system proof test state,
wherein the method further comprises the steps of:
determining the proof test filling level while said radar level gauge is in said proof test state; and
controlling, if a difference between said proof test filling level and said high level alarm limit is smaller than a threshold value, said radar level gauge back to said filling level measuring state.

33. A filling level measuring system comprising a host system and a radar level gauge coupled to said host system, for determining a filling level of a product in a tank, said radar level gauge comprising:

a transceiver for generating, transmitting and receiving electromagnetic signals;
a reference reflector arranged at a known reference reflector level at or above a high level alarm limit for said tank;
a propagating device connected to said transceiver and arranged to propagate a plurality of electromagnetic transmit signals from said transceiver towards said product in the tank, and to return to said transceiver a plurality of electromagnetic reflection signals, each including several echoes resulting from reflection of a corresponding one of said electromagnetic transmit signals at impedance discontinuities encountered by the electromagnetic transmit signal; and
processing circuitry for determining said filling level based on a surface echo resulting from reflection of one of said electromagnetic transmit signals at said surface of the product,
wherein said radar level gauge is controllable between a filling level measuring state and a proof test state,
wherein, in said proof test state, said processing circuitry is configured to:
determine a proof test filling level based on a reference reflector echo resulting from reflection of one of said electromagnetic transmit signals at the reference reflector; and
provide, to said host system, a signal indicative of the proof test filling level,
wherein, in said filling level measuring state, said processing circuitry is configured to:
determine the filling level of said product based on said surface echo resulting from reflection of one of said electromagnetic transmit signals at said surface of the product;
provide a signal indicative of said filling level to said host system;
receive, as an input to said radar level gauge, a system proof test start command;
control, in response to said system proof test start command, said radar level gauge to enter said proof test state; and
determine the proof test filling level while said radar level gauge is in said proof test state, wherein said host system is configured to control said radar level gauge back to said filling level measuring state, if a difference between said proof test filling level and said high level alarm limit is smaller than a threshold value.

34. The filling level system according to claim 33, wherein said reference reflector is attached to said propagation device.

35. The filling level measurement system according to claim 33, wherein said propagating device is a transmission line probe.

36. The filling level measuring system according to claim 35, wherein said reference reflector comprises:
- a first and a second part arranged to together substantially surround said transmission line probe; and
- at least one releasable fastener arranged to join said first part to said second part in such a way that said transmission line probe is clamped between said first part and said second part.

37. The filling level measuring according to claim 36, wherein said reference reflector comprises a first releasable fastener on a first side of said transmission line probe and a second releasable fastener on a second side of said transmission line probe opposite said first side, said second releasable fastener being offset relative to said first releasable fastener in a direction parallel to a longitudinal extension of said transmission line probe.

38. The filling level measuring according to claim 37, wherein said first releasable fastener and said second releasable include screws, the heads of which face the same way when the reference reflector is assembled.

39. The filling level measuring according to claim 33, wherein said propagating device is a radiating antenna.

40. The filling level measuring system according to claim 39, wherein said radiating antenna is selected from a set including a parabolic antenna, a horn antenna, and a still pipe feeder antenna, wherein said radiating antenna has a reference reflector attachment for mounting a reference reflector assembly, said reference reflector assembly including an elongated and laterally flexible suspension member coupled at an upper end to said reference reflector attachment and coupled at a lower end to a reflector surface having drip-off properties and to a weight for orientation of said reflector surface, wherein a distance between said radiating antenna and said reference reflector surface is adjustable.

41. The filling level measuring system according to claim 33, further comprising an additional filling level measuring device arranged to measure the filling level of the product in said tank.

* * * * *